Dec. 25, 1934.                C. KERR, JR., ET AL                    1,985,638
                    HEAD END ELECTRIC POWER SUPPLY FOR TRAINS
                        Filed March 1, 1933            2 Sheets-Sheet 1
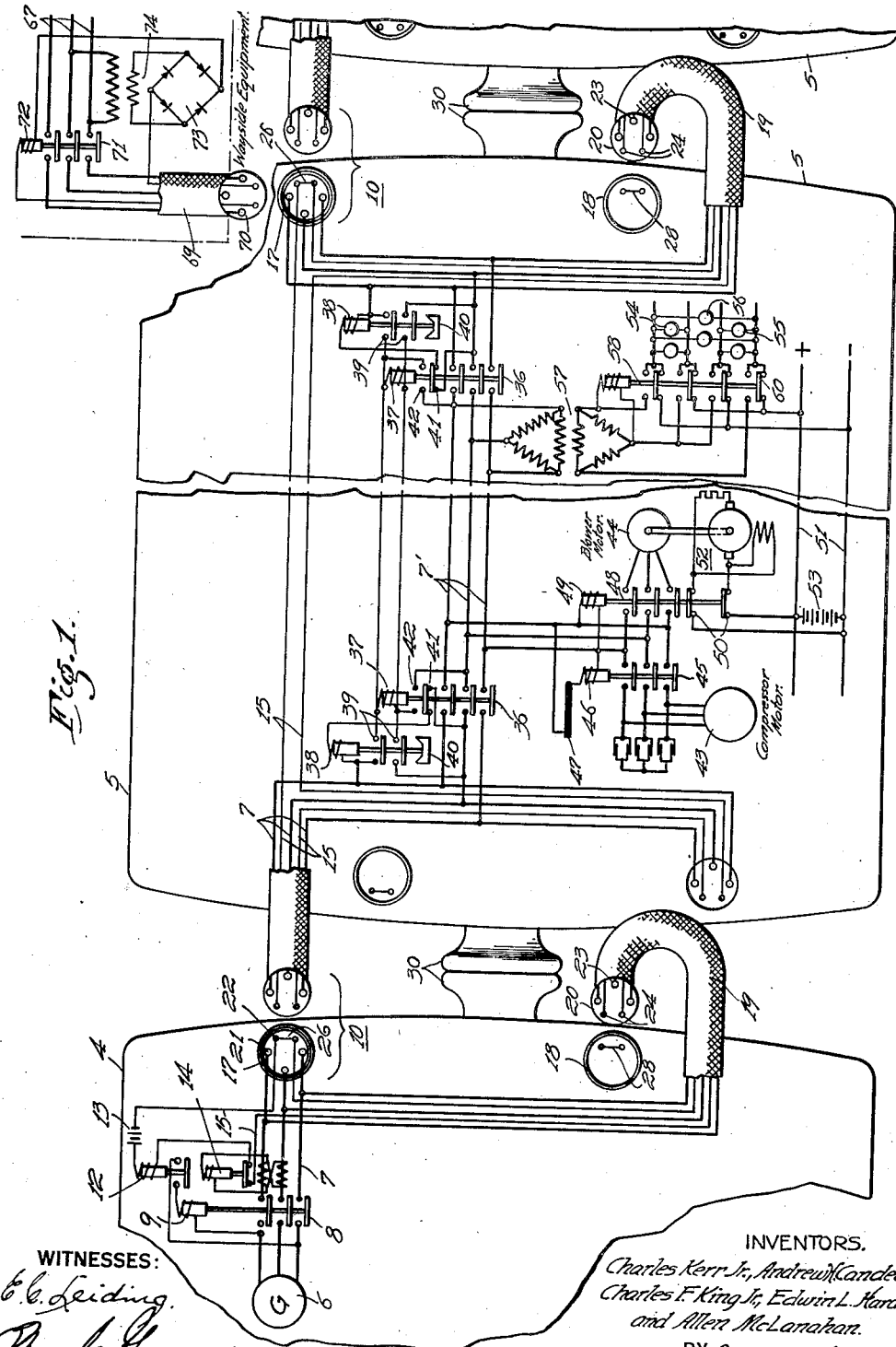
WITNESSES:
INVENTORS.
Charles Kerr Jr., Andrew K. Candee,
Charles F. King Jr., Edwin L. Harder
and Allen McLanahan.
BY
                ATTORNEY Dec. 25, 1934.   C. KERR, JR., ET AL   1,985,638
HEAD END ELECTRIC POWER SUPPLY FOR TRAINS
Filed March 1, 1933    2 Sheets-Sheet 2
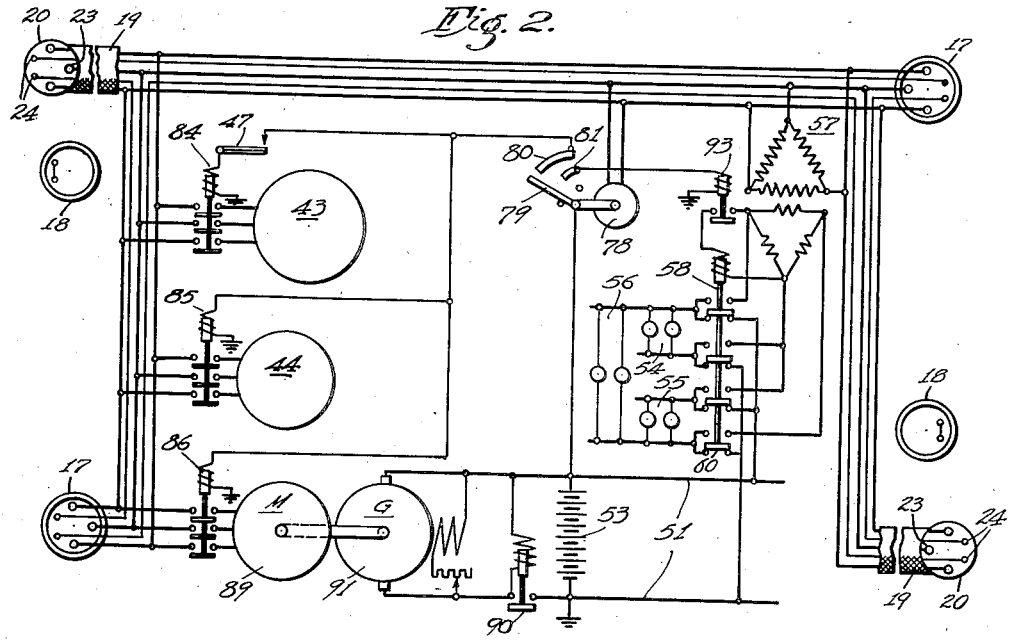
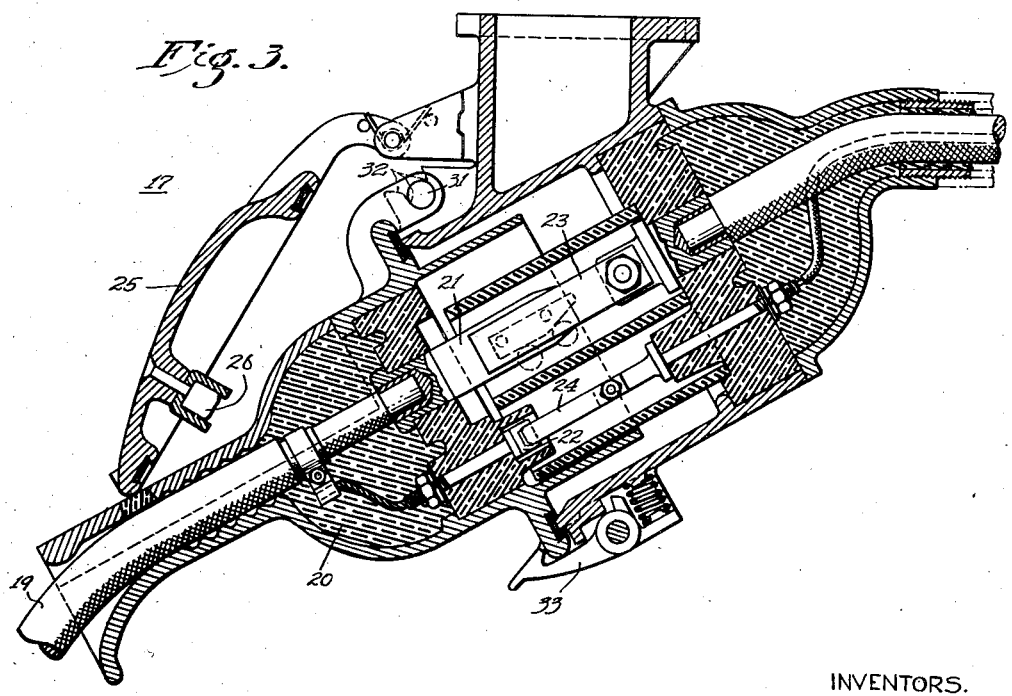
WITNESSES:
INVENTORS.
Charles Kerr Jr, Andrew H. Candee,
Charles F. King Jr, Edwin L. Harder
and Allen McLanahan,
BY
ATTORNEY Patented Dec. 25, 1934

1,985,638

UNITED STATES PATENT OFFICE 1,985,638

HEAD-END ELECTRIC POWER SUPPLY FOR TRAINS

Charles Kerr, Jr., Edgewood, Andrew H. Candee, Wilkinsburg, Charles F. King, Jr., Pittsburgh, Edwin L. Harder, Forest Hills, and Allen McLanahan, Wilkinsburg, Pa., assignors to Westinghouse Electric & Manufacturing Company, East Pittsburgh, Pa., a corporation of Pennsylvania Application March 1, 1933, Serial No. 659,196

12 Claims. (Cl. 171—313)

Our invention relates to head-end electric power supply systems for trains, by which we mean, systems in which electric current is supplied, to a plurality of cars of a train, from a single generating station which is located on one of the cars, usually, but not necessarily, at the head-end of the train, whence the name. Our system is more particularly designed to supply the large amounts of electric currents which are needed in the air-conditioning of passenger trains or in the refrigeration, or refrigeration and heating, of freight trains handling perishable goods.

One of the important features of our invention is the provision of jumper coupling means for coupling the electric supply circuits from car to car, with a novel type of control circuit protection which guards against the possibility of drawing power arcs in breaking the couplings.

Another feature of our invention is in a way related to the uncoupling feature just mentioned, in that, when the power circuit has been killed as a result of the act of beginning to couple or uncouple a coupling, it deenergizes a large number of heavy-duty compressor motors on different cars throughout the train, and when the power bus is again energized, means must be provided for insuring that all of these compressor motors do not restart at the same moment because the starting currents are several times the full-load currents. We therefore provide means for producing sequential starting of the equipments in the several cars, by which we mean that the heavy-duty circuits are energized at a plurality of different times so that only one, or a few, heavy-duty circuits are connected to the power supply system at the same moment.

According to our invention, we supply three-phase current to the main power bus of the train, at 440 volts, 60 cycles, or at any other voltage and frequency which is readily available in different cities along the right-of-way, so that when a car or a train is standing idle at a station, it may be plugged into the city supply at that station for pre-cooling or other electrical services independent of the power car, or car in which the power generator is located. In accordance with our invention, we provide a control circuit whereby current cannot be supplied to the train bus by both the power-car generator and the supply means at the wayside station, if the wayside plug connection is made while the generator car is connected to the train. The control circuit is so designed that the one source of power or the other will have the preference, the preference usually being given to the wayside power source which will be connected to the train bus in preference to the generator on the power car, when the wayside plug connection is made.

Our invention also provides means whereby the lighting circuit of the car may be energized from either the main power bus (through a step-down transformer) or from the usual 32-volt battery system, here again preference being given to the alternating-current power supply bus, which may be utilized to supply the lighting load whenever it is available.

With the foregoing objects in mind, and others which will be apparent as the description proceeds, our invention consists in the circuits, apparatus and systems hereinafter described and claimed and illustrated in the accompanying drawings, wherein Figure 1 is a diagrammatic view of a portion of a train illustrating the application of our invention, Fig. 2 is a diagrammatic view illustrating a modified form of the apparatus on one of the cars, and Fig. 3 is a longitudinal sectional view of one of the jumper coupling means for the electric circuits.

We have illustrated our invention as applied to an air-conditioned passenger-car train including a power car 4 and a plurality of passenger cars 5. The power car is so called because it contains a three-phase generator 6 for supplying electric power to the train, said generator being located either on the locomotive or in a compartment of a baggage car or at any other convenient place in the make-up of the train, and being supplied with energy from any suitable prime mover (not shown). The generator 6 supplies power to a three-phase bus 7 through an electromagnetic contactor 8 which quickly disconnects the generator from the power bus whenever its actuating coil 9 is deenergized.

The power bus 7 is extended throughout the length of the train, or throughout a plurality of cars thereof, by means of inter-car jumper connections 10 whereby the bus may be extended from car to car.

In accordance with our invention, we also utilize a ring circuit or loop circuit for control purposes, the same being so arranged that when the loop is closed, a circuit will be completed for energizing a control relay 12, which receives power from any suitable source, such as a 20 or 30-volt battery 13, in series with an over-current relay 14, and also in series with the two conductors of a double-conductor control-circuit bus 15 which constitutes the above-mentioned loop-circuit. This loop-circuit or control-circuit bus is also extended throughout the length of the train, or throughout the cars which are being supplied with electric power from the generator 6, by means of the same inter-car jumper connections 10 which handle the main bus connections of the "service" bus 7.

We have provided a novel means of making the above-menioned jumper connections from car to car in such manner as to cooperate effectively with our loop-circuit control system. For this purpose, we utilize, at each end of each car, by which we mean, at each end which is adapted for electrical coupling to another car, a main coupling receptacle 17, a dummy receptacle 18 and a jumper cable 19 which terminates in a plug 20. The main receptacle 17 is provided with five contact-sockets or fingers, of which three contact-sockets of fingers 21 are provided for the main circuit and two contact-sockets of fingers 22 are provided for the control circuit. In like manner the plug 20 has five contact members, of which three prongs 23 are for the main circuits and two prongs 24 are for the control circuits. The main receptacles 17 are normally closed by a spring closed lid which is shown in Fig. 3 and designated by the numeral 25. This lid, according to our invention, is essentially provided with bridging contact means 26 for short-circuiting the two control-circuit terminals 22 when the receptacle is not in use.

The dummy receptacle 18 is provided for the purpose of receiving the jumper plug 20 when the latter is not being used to make a connection from one car to the other and this dummy receptacle 18 is provided with means for short-circuiting the control-circuit terminals 24 of the plug, as indicated at 28.

As shown in Fig. 1, the main-circuit bus terminals 21 of the main receptacle 17, and the main-circuit bus terminals 23 of the jumper plug 20 are connected in parallel. On the other hand, the control-circuit bus terminals 22 of the main receptacle 17 and the control-circuit bus terminals 24 of the jumper plug 20 are connected in series, so that the loop circuit for completing the energization of the control relay 12 in the power car will be interrupted, if it is broken at either the main receptacle 17 or at the jumper plug 20.

Our specific jumper connections as above described are utilized in lieu of a special combination mechanical and electrical coupling between the cars of the train, because of the very great desirability of using standard couplings on the cars of all trains, as indicated schematically at 30. Our electrical connections are made, therefore, by means of jumpers as above described.

The physical appearance of one embodiment of these electrical connectors is indicated in Fig. 3, from which it will be apparent that the coupling is a relatively massive affair. The receptacle part 17 is stationary and carries the spring-closed pivoted lid 25. The plug part 20 is carried by the end of the jumper cable 19 and it is secured to the receptacle 17 by means of a special hinge connection comprising a pintle 31 which is carried by the plug and which is received in a kind of open socket 32 at the top of the receptacle, so that, when the plug is raised to a certain angle, the hinge connection is detachable. At the bottom of the receptacle, a latch 33 is provided for holding either the plug 17 or the lid 25 in place, as the case may be.

It will be observed from Fig. 3 that the two parts of the electrical coupling are separated by first disengaging the latch 33 at the bottom thereof, and then swinging the plug part upwardly about its pivot 31. It will be observed that the control-circuit contacts 22 and 24 are at the bottom and are so arranged that the opening movement of the plug separates the control contacts of the receptacle and plug long before the circuit is broken at the main contacts 21 and 23. In this way, the loop circuit of our control system is broken, thereby deenergizing the control relay 12, and hence the main contactor 8, on the power car, resulting in the instantaneous deenergization of the power bus 7 throughout the entire train, which is accomplished before the plug can be swung upwardly far enough to break the main contacts 21, 23.

When a car is not coupled to another car, its jumper plug 20 is kept in the dummy receptacle 18, where its control circuit terminals 24 are short circuited, thus keeping the loop closed at that end of the car. The spring lid 25 on the main receptacle 17 normally keeps the loop circuit terminals 22 closed at this receptacle. When the car is to be electrically coupled to another car, the jumper plug 20 of one of the cars is removed from its dummy receptacle and secured to the main receptacle of the other car, thereby completing the circuit, as indicated by the juxtaposition of the plug and receptacle in Fig. 1.

Each passenger car 5 is provided with means for staggering, in some way, the times at which load is thrown on the main power bus. In the form of embodiment shown in Fig. 1, this means takes the form of a main contactor 36 located near each end of the car for disconnecting the receptacle and plug connections at each end of the car from the power bus 7' which runs the length of the car. The main contactors 36 are provided with actuating coils 37 which are shown as being connected in parallel and being operated by either one of two time relays 38, one time relay being located at each end of the car, so that whichever end is connected to a source of power, one of the time relays 38 will be energized and, after a predetermined time delay, will close its contacts 39, thereby energizing the actuating coils 37 of both of the main contactors 36, whereby a through power-circuit bus connection 7' is made from one end of the car to the other. Any suitable or well-known type of time relay 38 may be utilized. For the purpose of simplicity of illustration, we have shown this time relay as being an electromagnetic type with a dash-pot 40 which is arranged to retard the closing of the contacts 39, but it will be understood that we are not limited to any particular type of time relay.

The energization of the time relays 38 is shown as being effected through back contacts 41 on the adjacent main contactors 36, so that as soon as the main contactor is energized, the time relay 38 will be deenergized, so that it will reset and be ready for immediate use as soon as the power supply is interrupted and reestablished. The main contactors meanwhile are kept from falling out, by means of auxiliary contacts 42 constituting a holding circuit for holding the contactors in, as long as power is supplied to the main bus 7, 7'.

The electrical equipment of the passenger cars is indicated very diagrammatically in Fig. 1 as comprising essentially a large three-phase compressor motor 43 and a three-phase blower motor 44, both of which constitute a part of the refrigerating and other air-conditioning equipment which is intended to be diagrammatically represented by these two essential parts. The compressor motor is connected to the main bus 7' through a contactor 45, the actuating coil 46 of which is energized through a thermostat 47 conveniently located in the car, so that the compressor motor may be started, so as to actuate the refrigerating equipment, whenever the car-temperature is too high, and so that the compressor motor is stopped whenever the car-temperature falls to a predetermined point.

The three-phase blower motor 44 is energized from the power bus 7' by a voltage-responsive contactor 48 having an operating coil 49 which is connected across one of the phases of the supply bus 7'. As long as there is power on the bus 7', the blower-motor contactor 48 will remain in its actuated position and will connect the three-phase blower motor 44 to said bus. When, however, the three-phase bus 7' is deenergized, the contactor 48 will drop, and back contacts 50 thereon will close a circuit from the usual battery circuit 51 of the car to a direct-current blower motor 52 so as to insure a movement of air for ventilating purposes, at all times. The battery circuit 51 is energized from a storage battery 53 which may be kept charged by any suitable means, not shown in Fig. 1.

In Fig. 1 we have also shown means for energizing the lighting circuits of the car from either the alternating-current bus 7' or the direct-current bus 51. We have shown three lighting circuits 54, 55 and 56 which are energized from the three phases of a step-down transformer 57, the primary windings of which are energized from the three-phase bus 7'. A voltage-responsive contactor 58 is utilized for the purpose of connecting these lighting circuits to the transformer 57 whenever there is sufficient voltage on the transformer. Upon a failure of the voltage across the transformer, back-contacts 60 on the contactor 58 come into play, to connect the three lighting circuits 54, 55 and 56 across the direct-current bus 51. It will be understood that the voltages of the direct-current bus 51 and the low-voltage side of the transformer 57 will be about equal. It will be noted that we have provided a very simple control system, with a minimum of switching operations, utilizing, in fact, only a single contactor 58, whereby the lights are energized from the alternating-current bus whenever the latter is energized, the lights being automatically transferred to the direct-current bus upon a deenergization of the alternating-current bus.

In the operation of an air-conditioned train in accordance with our invention, there will be times when the power car is disconnected from the train, or when a particular car or group of cars may be waiting at a station for the arrival of the train. At such times, it will be desirable to obtain power for the train or for any car or group of cars thereof from a wayside source.

The essential elements of a suitable wayside equipment for use in accordance with our invention are shown in Fig. 1. They consist of a three-phase power line 67 of the same voltage, frequency and phase-sequence as the generators 6 which are utilized on the various trains of the railroad system, said power line 67 being connected to the local municipal source of power, whenever possible. The wayside equipment is provided with a jumper connector 69 terminating in a plug 70 similar to the plugs previously described. The main-bus terminals of the jumper 69 are connected to the three-phase line 67 through an electromagnetic contactor 71 which serves a purpose similar to the main contactor 8 in the power car. The wayside contactor 71 is shown as being provided with an actuating coil 72 having more turns than the actuating coil of the control relay 12 in the power car, so that the wayside contactor 71 will operate on a smaller control-current than the relay 12 of the power car.

The control-bus terminals of the jumper 69 are connected to the actuating coil 72 of the wayside contactor 71, through a suitable source of voltage, such as a contact-rectifier set 73 which is energized from a small step-down transformer 74, so that, when the jumper plug 70 is connected to any one of the main receptacles 17 of any car of a train, a control circuit will be completed through the actuating coil 72 of the wayside contactor 71. This actuating coil 72 has sufficient resistance so that, if a power car 4 is also connected to the train at the same time, the loop circuit 15 will not carry enough current to actuate the power-car control relay 12, whereas the wayside relay coil 72, having more turns, will be readily actuated. It will be noted that, even though the power car 4 may be connected to the train, the act of raising the lid on one of the main receptacles 17, in order to insert the wayside jumper plug 70, will result in disconnecting the power-car generator 6 from the power bus of the train, so that when the wayside connection is made, the power will be supplied from the three-phase city bus 67 rather than from the power-car generator 6.

A modified form of our invention is shown in Fig. 2, wherein we have omitted the power-bus contactors 36 on the passenger cars, so that the power bus throughout the length of the train is energized all at once, instead of being energized sequentially in the successive cars. The sequential operation of the main power loads in the several cars of the train is secured, however, by means of timing relays in each car. One of said timing relays is illustrated in Fig. 2, by way of example, as comprising a small timing motor 78, which drives a movable contact arm 79 at a predetermined rate, so as to make contacts, at a predetermined time or times, which may be suitably adjusted, with one or more contact segments 80 and 81. As shown, the contact is made first with segment 80, which completes a circuit, at different times for different cars, from the positive conductor of the usual direct-current battery circuit 51 of the car, to a plurality of contactors 84, 85 and 86, which serve to energize, respectively, the three-phase compressor motor 43, the three-phase blower motor 44, and the three-phase motor 89 of a motor-generator set for charging the battery 53 of the direct-current line 51. A suitable reverse-current relay 90 is interposed between the generator 91 of the motor-generator set and the battery 53 so as to connect the generator only when its voltage is greater than that of the battery. The contactor 84 for the compressor motor is energized, as stated, from the contact segment 80 of the time-switch element, but only in case the thermostat 47 on the car indicates that the temperature of the car is higher than that which it is desired to maintain.

As indicated in Fig. 2, again purely by way of example, and in order to emphasize the flexibility of control afforded by our invention, we have shown the timing element 78 as controlling the lighting-circuit contactor 58 through an auxiliary relay 93 which is energized from the second contact-segment 81 of the timing element. By this means, we can, if desired, delay the connection of the lights to the alternating-current circuit until a time which is longer than the longest time-setting for any of the first contact-segments 80 on any of the cars, so that the fluctuations of the voltage on the alternating-current bus, as a result of the successive connections of heavy loads on the different cars, will be over, before the car lights are connected to the alternating-current bus.

While we have shown our invention in two different forms of embodiment, it will be understood that these are but illustrative, and that various changes may be made within the spirit of our invention. We desire, therefore, that the appended claims shall be accorded the broadest construction consistent with their language and the prior art.

We claim as our invention:

1. A system of electrical distribution particularly adapted for a multiple-car train having electric service circuits in a plurality of detachable cars, inter-car coupling means for joining said service circuits from one car to another, an electromagnetically actuated switch for connecting at least one of said service circuits to a source of electrical supply, and control-circuit means including a source of control current and a normally closed ring-circuit for putting said switch in condition to be closed when the ring-circuit is closed and for insuring the opening of said switch when the ring-circuit is interrupted, said coupling means providing means for extending said ring-circuit from car to car as said service circuits are joined together, the coupling means for a car including a main receptacle, a dummy receptacle, and a jumper terminating in a plug, at each end of the car, said main receptacle and said jumper having terminals for both said service circuit of the car and said ring-circuit, the service-circuit terminals of said main receptacle and of said plug being in parallel, and the ring-circuit terminals of said main receptacle and of said plug being in series with each other, said dummy receptacle being provided with means for receiving said plug and for short-circuiting the ring-circuit terminals of the plug, and a lid for the main receptacle having means thereon for short-circuiting the ring-circuit terminals of said receptacle when the lid is closed.

2. A system of electrical distribution particularly adapted for a multiple-car train having electric service circuits, in a plurality of detachable cars, inter-car coupling means for joining said service circuits from one car to another, an electromagnetically actuated switch for connecting at least one of said service circuits to a source of electrical supply, and control-circuit means including a source of control current and a normally closed ring-circuit for putting said switch in condition to be closed when the ring-circuit is closed and for insuring the opening of said switch when the ring-circuit is interrupted, said coupling means providing means for extending said ring-circuit from car to car as said service circuits are joined together and operating in such a manner that an interruption in the complete ring-circuit is effected at a coupling means before any interruption of a service circuit may be effected, the coupling means for a car including a main receptacle, a dummy receptacle, and a jumper terminating in a plug, at each end of the car, said main receptacle and said jumper having terminals for both said service circuit of the car and said ring-circuit, the service-circuit terminals of said main receptacle and of said plug being in parallel, and the ring-circuit terminals of said main receptacle and of said plug being in series with each other, said dummy receptacle being provided with means for receiving said plug and for short-circuiting the ring-circuit terminals of the plug, and a lid for the main receptacle having means thereon for short-circuiting the ring-circuit terminals of said receptacle when the lid is closed.

3. A system of electrical distribution particularly adapted for a multiple-car train having electric service circuits in a plurality of detachable cars, inter-car coupling means for joining said service circuits from one car to another, an electromagnetically actuated switch for connecting at least one of said service circuits to a source of electrical supply, and control-circuit means including a source of control current and a normally closed ring-circuit for putting said switch in condition to be closed when the ring-circuit is closed and for insuring the opening of said switch when the ring-circuit is interrupted, said coupling means providing means for extending said ring-circuit from car to car as said service circuits are joined together and operating in such a manner that an interruption in the ring-circuit is effected at a coupling means before any making or breaking of any service-circuit coupling may be effected, the coupling means for a car including a main receptacle, a dummy receptacle, and a jumper terminating in a plug, at each end of the car, said main receptacle and said jumper having terminals for both said service circuit of the car and said ring-circuit, the service-circuit terminals of said main receptacle and of said plug being in parallel, and the ring-circuit terminals of said main receptacle and of said plug being in series with each other, said dummy receptacle being provided with means for receiving said plug and for short-circuiting the ring-circuit terminals of the plug, and a lid for the main receptacle having means thereon for short-circuiting the ring-circuit terminals of said receptacle when the lid is closed.

4. A system of electrical distribution particulary adapted for a car adapted for use as a detachable unit of a multiple-car train, comprising an electric service circuit, a service-circuit coupler at each end of the car, a normally open switch between said service circuit and each coupler, and means responsive to the application of electric power to either coupler for automatically effecting the closure of both of said switches.

5. A system of electrical distribution particularly adapted for a multiple-car train having an electrical generator on one car, electric load circuits in one or more other cars, inter-car load-circuit coupling means between the cars, means for interrupting the current-supply from said generator before an alteration can be made in the condition of any inter-car load-circuit coupling means, and electro-responsive switch means in a load-circuit car having load-circuit coupling means at each end thereof, said electro-responsive switch means operating to interrupt the continuity of the circuit from one end of the car to the other in response to a deenergization of said circuit, said electro-responsive switch means being of a type which automatically recloses, after a predetermined delay, upon the re-energization of either side of said circuit.

6. A system of electrical distribution particularly adapted for a multiple-car train having electric service circuits in a plurality of detachable cars, inter-car coupling means for joining said service circuits from one car to another, an electromagnetically actuated switch for connecting at least one of said service circuits to a source of electrical supply, time-delay closing-switch mechanisms in series with a plurality of heavy-duty electric service circuits located in a plurality of cars, means for effecting an interruption of current-supply to all of said heavy-duty electric service circuits before any alteration can be made in the condition of any inter-car load-circuit coupling means and assuring the opening of all of said time-delay closing-switch mechanisms, and means responsive to a reestablishment of current-supply conditions for reclosing said time-delay closing-switch mechanisms after predetermined time delay.

7. A system of electrical distribution particularly adapted for a car adapted for use as a detachable unit of a multiple-car train, comprising a main-circuit bus and a double-conductor control-circuit bus running from one end of the car to the other, and inter-car electrical coupling means at the terminals of said busses at the respective ends of the car, said inter-car coupling means including a main receptacle, a dummy receptacle and a jumper terminating in a plug, at each end of the car, said main receptacle and said jumper having terminals for both said main-circuit bus and said control-circuit bus, the main-circuit bus terminals of said main receptacle and of said plug being in parallel and the control-circuit bus terminals of said main receptacle and of said plug being in series with each other, said dummy receptacle being provided with means for receiving said plug and for short-circuiting the control-circuit bus terminals of the plug, and a lid for the main receptacle having means thereon for short-circuiting the control-circuit bus terminals of said receptacle when the lid is closed.

8. A system of electrical distribution particularly adapted for a multiple-car train having electric service circuits in a plurality of detachable cars, inter-car coupling means for joining said service circuits from one car to another, an electrical generator in one car for supplying current to all of said service circuits, an electrically controlled switch in series with said generator, and control-circuit means including a source of control current and a normally closed ring-circuit for putting said switch in condition to be closed when the ring circuit is closed and for insuring the opening of said switch when the ring-circuit is interrupted, said coupling means providing means for extending said ring-circuit from car to car as said service circuits are joined together, characterized by the coupling means for a car including a main receptacle, a dummy receptacle, and a jumper terminating in a plug, at each end of the car, said main receptacle and said jumper having terminals for both said service circuit of the car and said ring-circuit, the service-circuit terminals of said main receptacle and of said plug being in parallel, and the ring-circuit terminals of said main receptacle and of said plug being in series with each other, said dummy receptacle being provided with means for receiving said plug and for short-circuiting the ring-circuit terminals of the plug, and a lid for the main receptacle having means thereon for short-circuiting the ring-circuit terminals of said receptacle when the lid is closed.

9. A system of electrical distribution particularly adapted for a multiple-car train having electric service circuits in a plurality of detachable cars, inter-car coupling means for joining said service circuits from one car to another, an electrical generator in one car for supplying current to all of said service circuits, a wayside supply-circuit external of said train, coupling means for joining said wayside supply-circuit to an electric service circuit in one of said cars, electrically responsive switches for disconnecting and connecting into service said generator and said wayside supply-circuit respectively, and control-circuit means for closing only one of said electrically responsive switches when load-circuit couplings are completed to both said generator and said wayside supply-circuit at the same time and for insuring the opening of both of said electrically-responsive switches before any change may be made in any load-circuit coupling.

10. A system of electrical distribution particularly adapted for a multiple-car train having electric service circuits in a plurality of detachable cars, inter-car coupling means for joining said service circuits from one car to another, an electrical generator in one car for supplying current to all of said service circuits, a wayside supply-circuit external of said train, coupling means for joining said wayside supply-circuit to an electric service circuit in one of said cars, electrically responsive switches for disconnecting and connecting into service said generator and said wayside supply-circuit respectively, and control-circuit means for closing only one of said electrically responsive switches when load-circuit couplings are completed to both said generator and said wayside supply-circuit at the same time and for insuring the opening of both of said electrically-responsive switches before any change may be made in any load-circuit coupling, said control-circuit means comprising a normally closed ring-circuit, said coupling means provided for extending said ring-circuit from car to car and to wayside equipment as said service-circuit couplings are made, and a source of control current operatively associated with each of said electrically responsive switches and with said ring-circuit.

11. A system of electrical distribution particularly adapted for a multiple-car train having through busses and electrically coupled power service circuits for individual load devices in a plurality of detachable cars, inter-car electrical coupling means for joining said through busses from one car to another, an electromagnetically actuated switch for connecting at least one of said through busses to a source of electrical supply, control-circuit apparatus for opening said switch before any change may be made in any of said electrical coupling means and for automatically closing said switch and simultaneously energizing the through busses of all electrically coupled cars of the train when all control-circuit apparatus is in proper condition, and a plurality of differently timed bus-energization-responsive time-relays interposed between the through busses and individual load devices in a plurality of cars, the through busses running at all times uninterruptedly from one end to the other of the cars in which they are located.

12. A system of electrical distribution for a car adapted for use as a detachable unit of a multiple-car train, comprising a polyphase main-circuit bus running from one end of the car to the other, and inter-car electrical coupling means at the terminals of said bus at the respective ends of the car, a step-down polyphase transformer associated with said bus for deriving therefrom a plurality of low-voltage currents of different phases, a battery circuit carried by said car, said battery circuit having substantially the same voltage as the low-voltage transformer circuits, a plurality of lighting-load circuits on the car, a relay having an operating coil energized in response to the energization of said bus and arranged to cause the lighting-load circuits to be separately energized from different phases of the low-voltage circuits of said transformer when the bus is suitably energized, and to cause said lighting-load circuits to be disconnected from said transformer and to put said lighting-load circuits in condition to be energized all in parallel from said battery-circuit when the main-circuit bus is not suitably energized.

CHARLES KERR, Jr.
ANDREW H. CANDEE.
CHARLES F. KING, Jr.
EDWIN L. HARDER.
ALLEN McLANAHAN.